US011429662B2

(12) United States Patent
Malkosh et al.

(10) Patent No.: US 11,429,662 B2
(45) Date of Patent: Aug. 30, 2022

(54) MATERIAL SEARCH SYSTEM FOR VISUAL, STRUCTURAL, AND SEMANTIC SEARCH USING MACHINE LEARNING

(71) Applicant: SWATCHBOOK, Inc., Irvine, CA (US)

(72) Inventors: Yazan W. Malkosh, Laguna Niguel, CA (US); Thomas Teger, Orange, CA (US)

(73) Assignee: SWATCHBOOK, Inc., Irvine, CA (US)

( * ) Notice: Subject to any disclaimer, the term of this patent is extended or adjusted under 35 U.S.C. 154(b) by 208 days.

(21) Appl. No.: 16/723,525

(22) Filed: Dec. 20, 2019

(65) Prior Publication Data

US 2021/0191969 A1   Jun. 24, 2021

(51) Int. Cl.
*G06F 16/55* (2019.01)
*G06F 16/583* (2019.01)
*G06N 3/08* (2006.01)
*G06V 10/75* (2022.01)

(52) U.S. Cl.
CPC .......... *G06F 16/55* (2019.01); *G06F 16/5838* (2019.01); *G06F 16/5862* (2019.01); *G06N 3/08* (2013.01); *G06V 10/751* (2022.01)

(58) Field of Classification Search
CPC .. G06F 16/55; G06F 16/5838; G06F 16/6202; G06N 3/08
USPC ....................................................... 707/740
See application file for complete search history.

(56) References Cited

U.S. PATENT DOCUMENTS

| | | | |
|---|---|---|---|
| 7,519,200 B2 | 4/2009 | Gokturk et al. | |
| 7,823,055 B2 | 10/2010 | Sull et al. | |
| 8,429,174 B2* | 4/2013 | Ramani | G06F 16/5854 |
| | | | 707/755 |
| 8,798,362 B2 | 8/2014 | Wang et al. | |
| 9,990,665 B1 | 6/2018 | Dhua | |
| 2005/0168460 A1* | 8/2005 | Razdan | G06F 16/904 |
| | | | 345/419 |
| 2006/0098231 A1 | 5/2006 | Konishi | |
| 2008/0183685 A1* | 7/2008 | He | G06F 16/24575 |
| 2018/0068205 A9 | 10/2018 | Hill et al. | |
| 2019/0205962 A1* | 7/2019 | Piramuthu | G06F 16/9535 |
| 2019/0244271 A1 | 8/2019 | Piramuthu et al. | |
| 2019/0347526 A1* | 11/2019 | Sunkavalli | G06K 9/46 |
| 2020/0201900 A1* | 6/2020 | Sdorra | G06K 9/4652 |
| 2020/0320769 A1* | 10/2020 | Chen | G06K 9/6267 |

\* cited by examiner

*Primary Examiner* — Shahid A Alam
(74) *Attorney, Agent, or Firm* — Olav M. Underdal; IDP Patent Services

(57) ABSTRACT

A material search system, includes a material search server, including a processor, a non-transitory memory, an input/output, a material library for storing material representations, a material search manager, a machine learner, an image translation model, and a semantic model; and a material search device. Each material representation includes a visual image, a color palette, a structural image, and a semantic structure. Also disclosed is a method of searching a material library and generating output material representations; including performing reverse image, reverse structure, and semantic searches; training image and structural translation models; and training a semantic model.

20 Claims, 6 Drawing Sheets

Material Search System

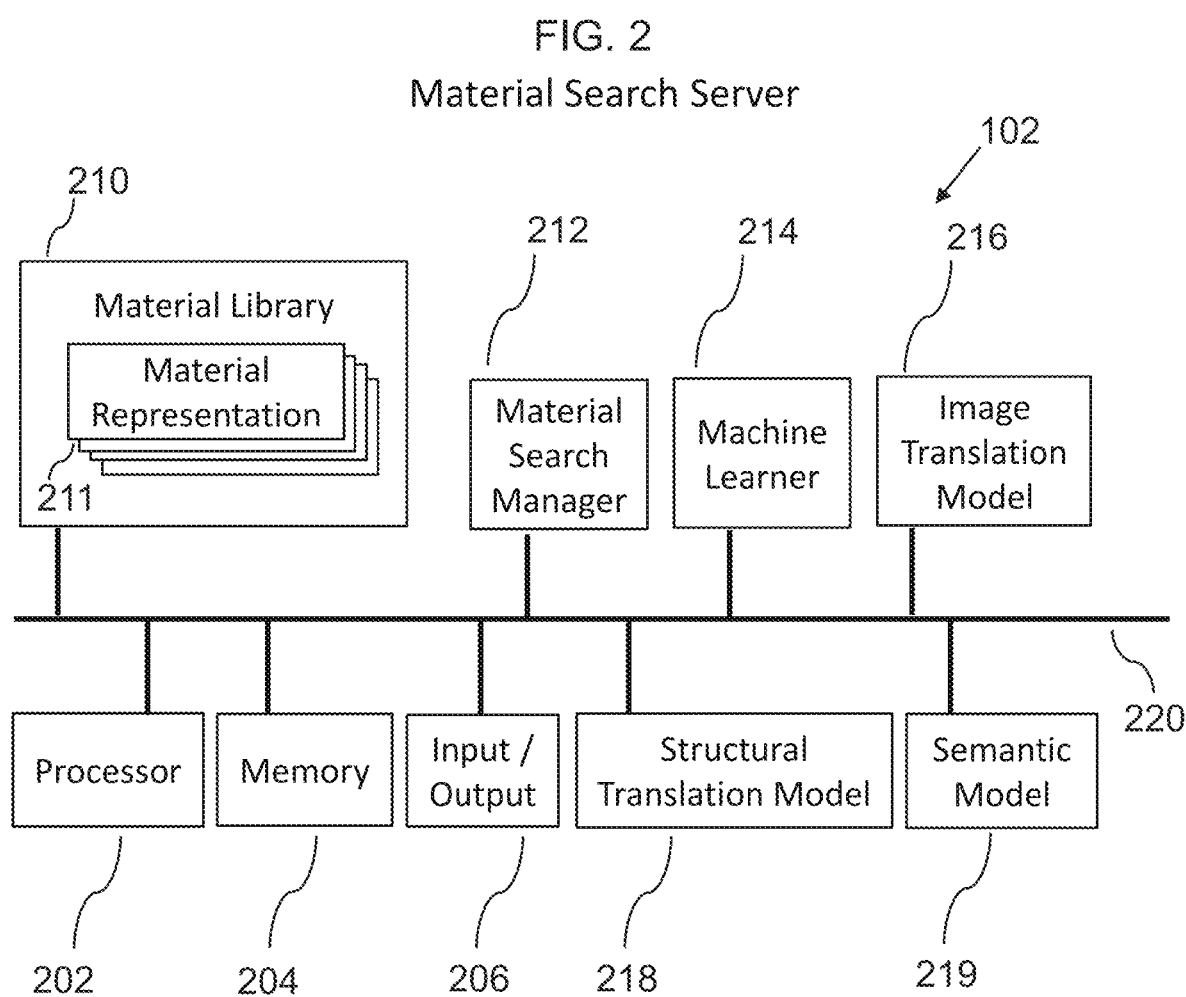

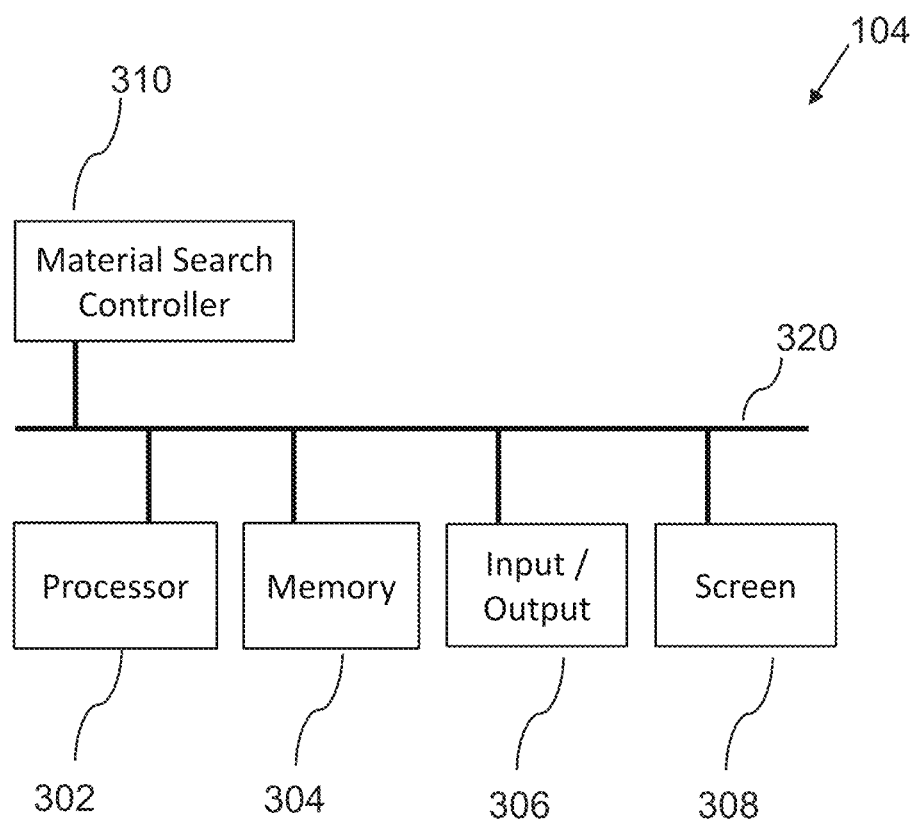

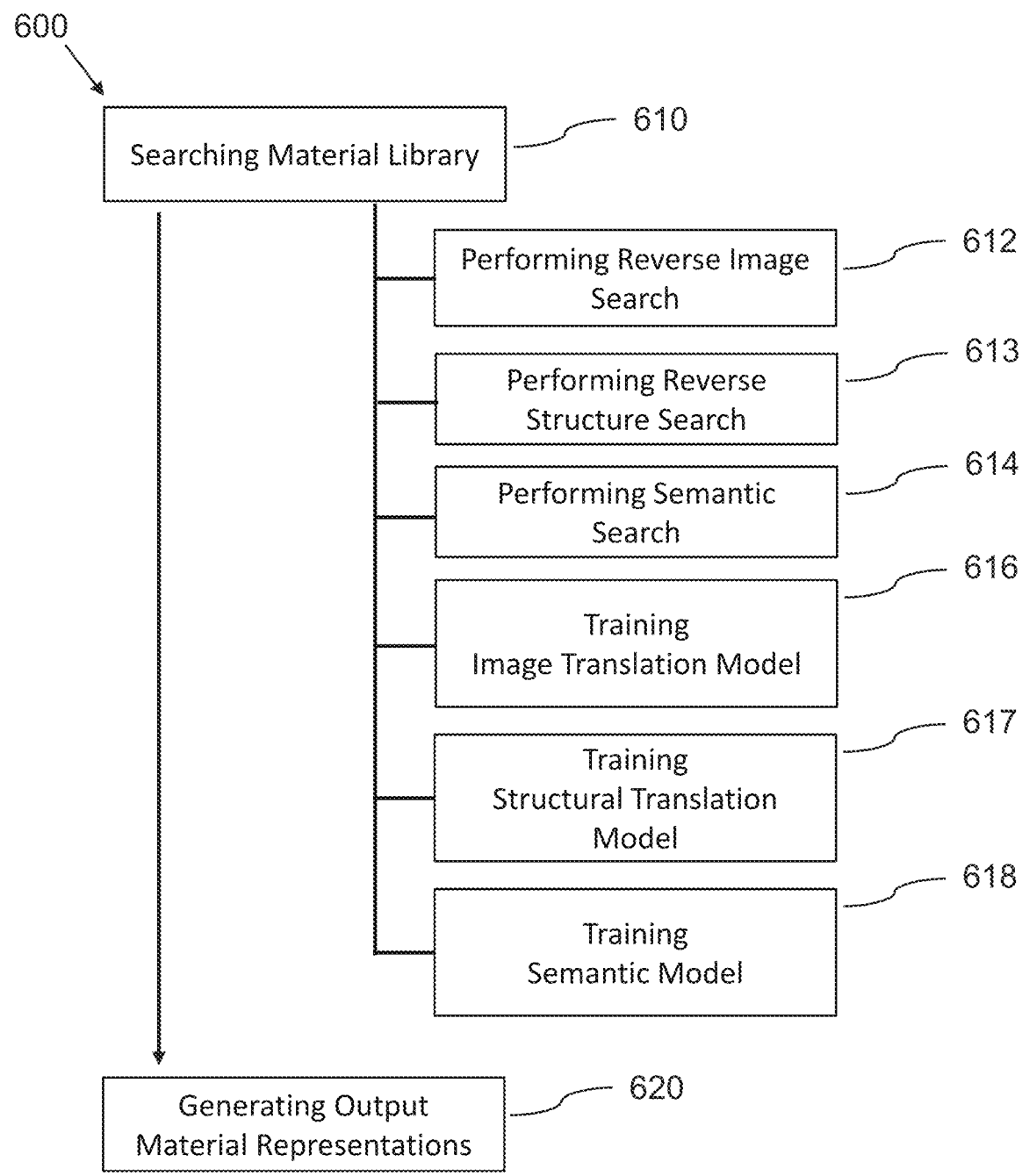

MATERIAL SEARCH SYSTEM FOR VISUAL, STRUCTURAL, AND SEMANTIC SEARCH USING MACHINE LEARNING

CROSS-REFERENCE TO RELATED APPLICATIONS

N/A.

FIELD OF THE INVENTION

The present invention relates generally to the field of image searching, and more particularly to methods and systems for image search using visual, structural, and semantic information.

BACKGROUND OF THE INVENTION

Image search, also called reverse image search, is well-known and in common use for various search applications. However, such search methods are unable to account for the structure of the images or materials searched for, and also generally take into account meta and semantic information concerning the images under search.

As such, considering the foregoing, it may be appreciated that there continues to be a need for novel and improved devices and methods for presenting digital representations of materials via methods of product visualization.

SUMMARY OF THE INVENTION

The foregoing needs are met, to a great extent, by the present invention, wherein in aspects of this invention, enhancements are provided to the existing model of product visualization.

In an aspect, a material search system, can include:
a) a material search server, comprising:
  a processor;
  a non-transitory memory;
  an input/output component;
  a material library, which includes a plurality of stored material representations, each including a visual image, which is a representation of a physical material sample; and
  a material search manager, which can be configured to search in the stored material representations of the material library; and
b) a material search device, which is connected to the material search server;
wherein the material search device can be configured to enable a user to search for images in the material library, by using search criteria provided by the user;
such that the material search manager generates a plurality of output material representations that match the search criteria.

In a related aspect, each stored material representation in the plurality of stored material representations can further include:
  a color palette, which comprises a plurality of primary material colors that are used in the visual image.

In another related aspect, each stored material representation in the plurality of stored material representations can further include:
  a structural image, which is a two-dimensional matrix of heights of the physical material sample.

In yet another related aspect, each stored material representation in the plurality of stored material representations can further include:
  a semantic structure, which comprises at least one tag, which describes a property of the physical material sample.

In a related aspect, the material search manager can be configured to perform an image search using a reverse image search algorithm, wherein the reverse image search algorithm takes an input visual image and returns a plurality of matching output visual images, which are associated with the stored material representations of the material library.

In another related aspect, the material search manager can be configured to perform a structure search using a structure search algorithm, wherein the structure search algorithm takes an input structural image and returns a plurality of matching output structural images, which are associated with the plurality of stored material representations of the material library.

In yet another related aspect, the material search manager can be configured to perform a semantic search by searching for material representations with the semantic structure that includes at least one input tag, wherein the structure search algorithm takes the at least one input tag and returns a plurality of matching output material representations.

In a related aspect, the material search manager can be configured to train an image translation model using a machine learning method to compare an input visual image with a target visual image to produce a visual match indicator;
wherein the image translation model is trained on a plurality of pairs of a generated translated visual image, which is generated by an automatic translation from an original visual image, and the original visual image, to produce a positive visual match indicator;
wherein the automatic translation comprises at least one or a combination of position movement, rotation, and size scaling of the original visual image.

In a further related aspect, the image translation model can be a convolutional artificial neural network with at least two hidden layers.

In a related aspect, the material search manager can be configured to train an image translation model using a machine learning method to compare an input structural image with a target structural image to produce a structural match indicator;
wherein the image translation model can be trained on a plurality of pairs of a generated translated structural image, which is generated by an automatic translation from an original structural image, and the original structural image, to produce a positive structural match indicator;
wherein the automatic translation can include at least one or a combination of position movement, rotation, and size scaling of the original structural image.

In another related aspect, the material search manager can be configured to train a semantic model using a machine learning method to compare an input structural image with a target tag to produce a semantic match indicator;
wherein the semantic model is trained on a plurality of pairs of the visual image and an associated tag in the at least one tag, to produce a positive semantic match indicator.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2 is a schematic diagram illustrating a material search device, according to an embodiment of the invention.

FIG. 3 is a schematic diagram illustrating a material search server, according to an embodiment of the invention.

FIG. 6 is a flowchart illustrating steps that may be followed, in accordance with one embodiment of a method or process of product visualization.

DETAILED DESCRIPTION

Figure 1:
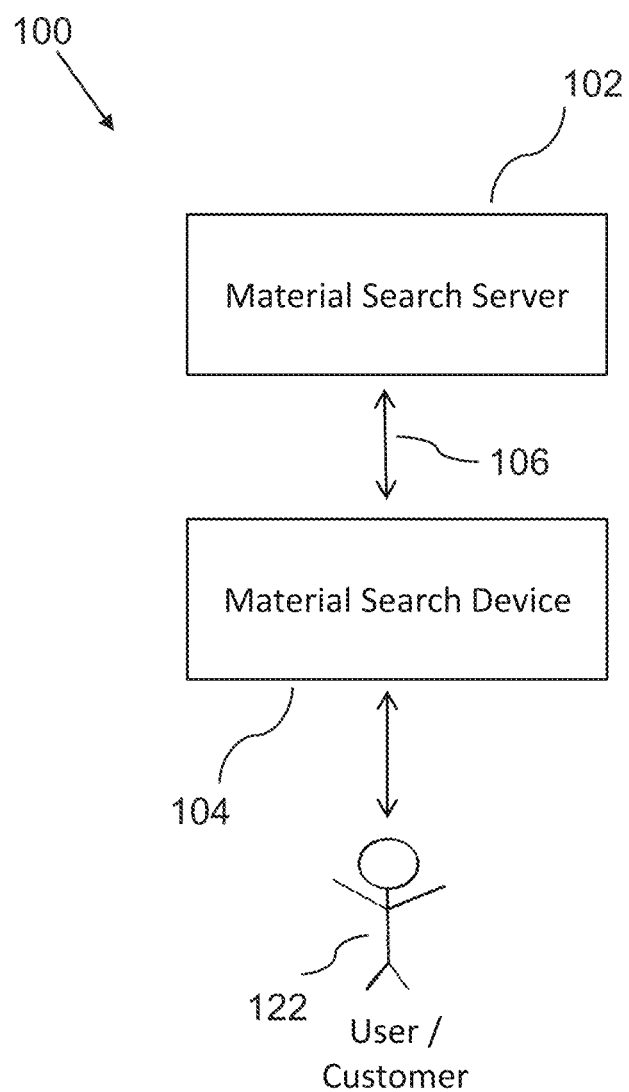
FIG. 1 is a schematic diagram illustrating a material search system, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a material search system 100, with reference to FIG. 1, in such manner that like reference numerals refer to like components throughout; a convention that we shall employ for the remainder of this specification.

In an embodiment, as shown in FIG. 1, a material search system 100 can include:
a) a material search server 102; and
b) a material search device 104, such that the material search device 104 can be connected to the material search server 102;
wherein the material search device 104 is configured to enable a user 122 to search for material representations in a material library 210, by using search criteria provided by the user 122;
such that the material search manager 212 generates a plurality of output material representations that match the search criteria.

In a related embodiment, as shown in FIG. 2, a material search server 102 can include:
a) a processor 202;
b) a non-transitory memory 204;
c) an input/output component 206;
d) a material library 210, comprising a plurality of stored material representations; and
e) a material search manager 212, for searching material representations that are stored in the material library 210; and
f) a machine learner 214, which uses/processes a machine learning algorithm for training and executing an image translation model 216 and a semantic model 219. The machine learning algorithm can use well-known methods of machine learning, including artificial neural networks, such as deep learning feed-forward neural networks with back-propagation learning, genetic algorithms; support vector machines, and cluster classification; all connected via
g) a data bus 220.

In a related embodiment, as shown in FIG. 3, a material search device 104 can include:
a) a processor 302;
b) a non-transitory memory 304;
c) an input/output 306;
d) a screen 308; and
e) a material search controller 310, for providing a search graphical user interface; all connected via
f) a data bus 320.

In a related embodiment, the material library 210 can store a plurality of material representations, wherein each material representation can include:
a) a visual image 400b, which is a representation of a physical material sample 400a, which can be a fabric material or other type of material, such that the visual image 400b can be a two-dimensional matrix of color code values of the physical material sample 400a, such as RGB values, or according to some other color model/color-coding scheme. A grey scale filtered version of the visual image 400b, can be generated to represent a pattern image of the physical material sample 400a;
b) a color palette, which can include a plurality of primary material colors that are used in the visual image, which for example can be 4 primary material colors;
c) a structural image; which describes the texture of the physical material sample 400a, and can be a two-dimensional matrix of the heights or displacement of the physical material sample 400a; and
d) a semantic structure, which comprises at least one tag or a plurality of tags, which can a taxonomy of tags (i.e. a directed acyclic graph of connected tags), wherein each tag describes an attribute or property of the physical material sample 400a.

In a further related embodiment, the structural image can be a normal map, also called a bump map.

In a further related embodiment, the machine learning algorithm can be a convolutional artificial neural network with at least two hidden layers, such that the configuration generation model is implemented by the optimized/trained convolutional artificial neural network, which can be trained/optimized using well-known artificial neural network deep learning methods, including backpropagation and other non-linear function optimization methods. In many related embodiments, learning/training can be unsupervised, in order to ensure hidden/unknown rating bias is found/incorporated, but in some embodiments, learning may be supervised or partially supervised, and may employ reinforcement learning.

In related embodiments, the material search system 100 provides enhanced search capabilities by searching across the combined visual, structural and semantic information provided by the material representation, with further search enhancement provided by machine learning.

In a related embodiment, the material search manager 212 of the material search server 102 can be configured to perform a reverse image search using a reverse image search algorithm, according to well-known methods for reverse image search, wherein the reverse image search algorithm takes an input image and returns a plurality of matching output images associated with material representations of the material library 210. The input image can include:
a) A material sample image retrieved from the material library 210, which can include an image of a pattern, a material sample, a graphic, and designs captured by a product design application;
b) a saved image, retrieved from a photo in a device photo library of the material search device 104; or
c) an image of a hand sketch, drawing, image, or pattern generated by a drawing/design application, such as for example ADOBE PHOTOSHOP™ or ADOBE ILLUSTRATOR™.

In a related embodiment, the material search manager 212 of the material search server 102 can be configured to perform a structure search using a structure search algorithm, according to well-known methods for image search (since the structural image can be considered an image of heights/displacement), also known as reverse image search, wherein the structure search algorithm takes a structural image and returns a plurality of matching output images. The input structural image can include:
a) If present, use a material's normal, displacement, bump, height map to find matching materials. This broadens the search by not only looking for pattern and color, but also structure, thus leading to better results; and
b) through smart extraction from an image develop normal, displacement, bump, height maps. While only an approximation, this can be used to further refine results.

In a related embodiment, the material search manager 212 of the material search server 102 can be configured to perform a semantic search of the material representations, wherein the semantic search takes at least one input tag and returns a plurality of matching output material representations with a semantic structure that includes the at least one input tag. The input can include at least one tag, which can be part of a tag semantic structure, or other types of meta data. The user can determine how many results will be returned by the semantic search.

In a related embodiment, the material search manager 212 can search in:

a) a personal online library for materials and graphics;
b) a curated library populated with materials and graphics by approved vendors;
c) a public library for materials and graphics; and/or
d) refine search by relaxing search parameters, in particular when using guided search.

In a related embodiment, the material search manager 212 can:
a) Execute an image search for similar patterns, finding material representations with matching image pattern and color;
b) Execute an image search for similar patterns, finding material representations with matching pattern and color in different orientations;
c) Execute an image search for similar patterns, finding material representations with matching pattern;
d) Execute an image search for similar patterns, finding material representations with matching pattern in different orientations;
e) Execute an image search for similar color, finding material representations with matching color palette, wherein the image search can be prioritized by order of dominant, secondary, and tertiary colors;
f) Execute a structure search for similar material texture, finding material representations with matching structural image. Resulting material representation may not match in color or pattern, but structure; and/or
g) Filter search results by combining with semantic search, also called guided search, which aids in delivering better matching results by delivering only search results that match with provided semantic search parameters, such as at least one tag of a semantic structure.

In related embodiments, search output from the material search manager 212 can include:
a) Material representations for materials, including fabrics and other types of materials such as papers, metal sheets, printed sheets, etc.; or
b) Graphics and patterns.

In related embodiments, search results can be refined using machine learning methods provided by the material search manager 212, which can include:
a) Utilize machine learning on previous search results to improve future searches;
b) Identify through an image what type of material the user is searching for; and/or
c) Tag search results using suggested tags to further classify the search result.

In related embodiments, the material search manager 212 can be trained using machine learning methods, to:
a) Search for similar output visual images within an image translation, including at least one or a combination of position movement, rotation, and size scaling; and
b) Associate images with tags & meta data, including any user defined tag, or meta-data of the material such as composition, manufacturing country, price, etc.

Thus, in an embodiment, a material search system 100, can include:
a) a material search server 102, comprising:
a processor 202;
a non-transitory memory 204;
an input/output component 206;
a material library 210, which comprises a plurality of stored material representations 211, each comprising a visual image 400*b*, which is a representation of a physical material sample 400*a*; and a material search manager 212, which is configured to search in the stored material representations 211 of the material library 210; and b) a material search device 104, which is connected to the material search server 102;

wherein the material search device 120 is configured to enable a user 122 to search for images 400b in the material library 210, by using search criteria provided by the user 122;

such that the material search manager 212 generates a plurality of output material representations 211 that match the search criteria.

Figure 5:
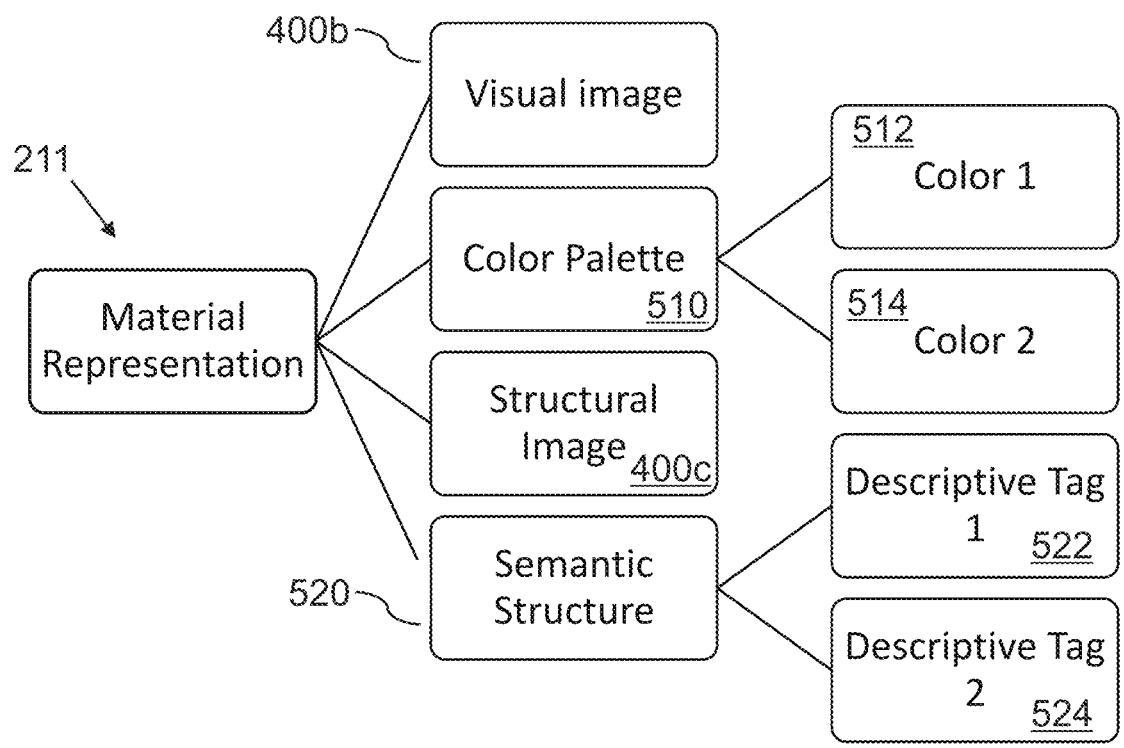
FIG. 5 is a schematic diagram illustrating a data structure for a material representation, according to an embodiment of the invention.

In a related embodiment, as shown in FIGS. 2 and 5, each stored material representation 211 in the plurality of stored material representations 211 can further include:

a color palette 510, which comprises a plurality of primary material colors 512, 514 that are used in the visual image 400b.

Figure 4A:
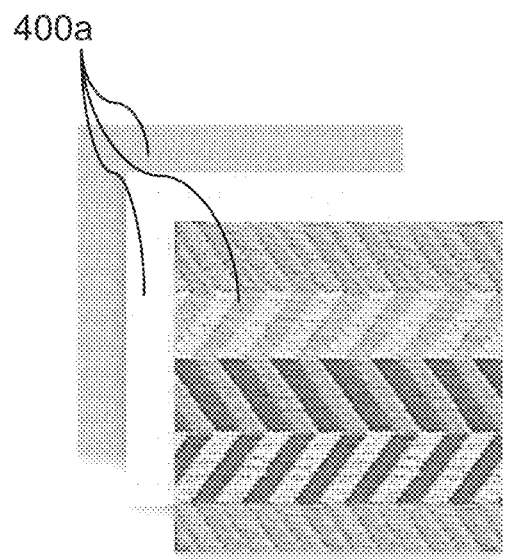
FIG. 4A is an illustration of physical material samples of the material search system, according to an embodiment of the invention.
Figure 4B:
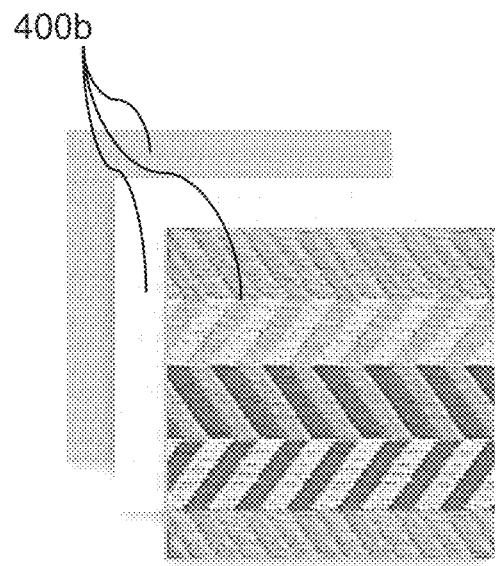
FIG. 4B is an illustration of digital visual image representations of the material search system, according to an embodiment of the invention.
Figure 4C:
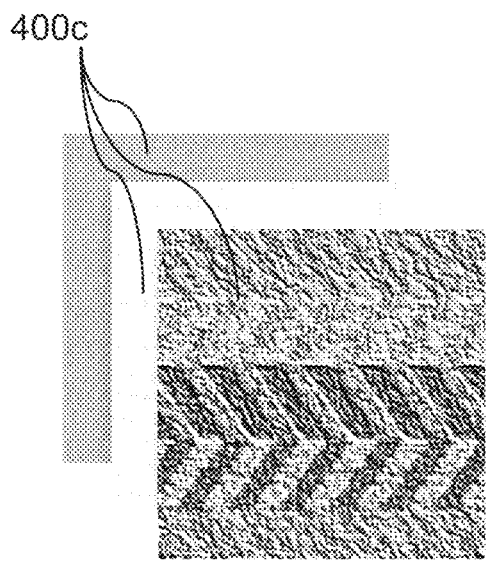
FIG. 4C is an illustration of digital structural image representations of the material search system, according to an embodiment of the invention.

In another related embodiment, as shown in FIGS. 2 and 4C, each stored material representation 211 in the plurality of stored material representations 211 can further include:

a structural image 400c, which is a two-dimensional matrix of heights 400c of the physical material sample 400a. The structural image can also be described as a texture map 400c of the texture of the physical material sample 400a.

In yet another related embodiment, as shown in FIGS. 2 and 5, each stored material representation 211 in the plurality of stored material representations 211 can further include:

a semantic structure 520, which comprises at least one tag 522, 524, which describes a property of the physical material sample. A tag 522, 524 can for example have values such as smooth-tag, rough-tag, abrasive-tag, very-smooth-tag, flat-tag, etc.

In a related embodiment, the material search manager can be configured to perform a reverse image search using a reverse image search algorithm, wherein the reverse image search algorithm takes an input visual image 400b and returns a plurality of matching output visual images 400b, which are associated with the stored material representations 211 of the material library 210. The reverse image search algorithm can use well-known methods for reverse image search, including scale-invariant feature transform search, maximally stable extremal region search, vocabulary tree search.

In another related embodiment, the material search manager 212 can be configured to perform a reverse structure search of the material representations 210 using a reverse structure search algorithm, wherein the reverse structure search algorithm takes an input structural image 400c and returns a plurality of matching output structural images 400c, which are associated with the plurality of stored material representations 211 of the material library 210. The reverse structure search algorithm can use well-known methods for reverse image search, including scale-invariant feature transform search, maximally stable extremal region search, vocabulary tree search.

In yet another related embodiment, the material search manager 212 can be configured to perform a semantic search of the material representations 211, wherein the semantic search takes at least one input tag 522, 524 and returns a plurality of matching output material representations 211 with a matching semantic structure 520 that includes the at least one input tag 522, 524.

In a related embodiment, the material search server 102 can further include:

an image translation model 216;

wherein the machine learner 214 can be configured to train the image translation model 216 using a machine learning method to compare an input visual image 400b with a target visual image 400b to produce a visual match indicator;

wherein the image translation model 216 is trained on a plurality of pairs of a generated translated visual image 400b and the original visual image 400b, to produce a positive visual match indicator;

wherein the generated translated visual image 400b is generated by an automatic translation from an original visual image 400b;

wherein the automatic translation comprises at least one or a combination of position movement, rotation, and size scaling of the original visual image 400b.

In a further related embodiment, the image translation model 216 can be a convolutional artificial neural network with at least two hidden layers.

In a related embodiment, the material search server 102 can further include:

a structural translation model 218;

wherein the machine learner 214 can be configured to train the structural translation model 218 using a machine learning method to compare an input structural image 400c with a target structural image 400c to produce a structural match indicator;

wherein the structural translation model 218 can be trained on a plurality of pairs of a generated translated structural image 400c and an original structural image 400c, to produce a positive structural match indicator;

wherein the generated translated structural image 400c is generated by an automatic translation from an original structural image 400c, wherein the automatic translation can include at least one or a combination of position movement, rotation, and size scaling of the original structural image 400c.

In another related embodiment, the material search server 102 can further include:

a structural translation model 218;

wherein the machine learner 214 can be configured to train the semantic model 219 using a machine learning method to compare an input structural image 400c with a target tag 522 to produce a semantic match indicator; wherein the semantic model 219 is trained on a plurality of pairs of a structural image 400c and an associated tag 522, 524 in the at least one tag 522, 524, to produce a positive semantic match indicator.

In an embodiment, as illustrated in FIG. 6, a method of material searching 600, can include:

a) Searching 610 a material library 210 according to predetermined search criteria, wherein the material library 210 comprises a plurality of stored material representations 211, each comprising a visual image, which is a representation of a physical material sample; and b) generating 620 a plurality of output material representations 211 that match the search criteria.

In a related embodiment, the method of material searching 600 can further include:

performing a reverse image search 612 in the material library using a reverse image search algorithm, wherein the reverse image search algorithm takes an input visual image 400b and returns a plurality of matching output visual images 400b, which are associated with the stored material representations 211 of the material library 210.

In another related embodiment, the method of material searching 600 can further include:

performing a reverse structure search 613 in the material library using a reverse structure search algorithm, wherein the reverse structure search algorithm takes an input structural image 400c and returns a plurality of matching output structural images 400c, which are associated with the plurality of stored material representations 211 of the material library 210.

In yet another related embodiment, the method of material searching 600 can further include:

performing a semantic search 614 of the material representations, wherein the semantic search takes at least one input tag 522, 524 and returns a plurality of matching output material representations 211 with a matching semantic structure 520 that includes the at least one input tag 522, 524.

In a related embodiment, the method of material searching 600 can further include:

training an image translation model 616 using a machine learning method to compare an input visual image 400b with a target visual image 400b to produce a visual match indicator;

wherein the image translation model 216 is trained on a plurality of pairs of a generated translated visual image 400b and an original visual image 400b, to produce a positive visual match indicator;

wherein the generated translated visual image 400b is generated by an automatic translation from the original visual image 400b, wherein the automatic translation comprises at least one or a combination of position movement, rotation, and size scaling of the original visual image 400b.

In another related embodiment, the method of material searching 600 can further include:

training a structural translation model 617 using a machine learning method to compare an input structural image with a target structural image to produce a structural match indicator;

wherein the structural translation model 218 is trained on a plurality of pairs of a generated translated structural image 400c and an original structural image 400c, to produce a positive structural match indicator;

wherein the generated translated structural image 400c is generated by an automatic translation from the original structural image 400c, wherein the automatic translation comprises at least one or a combination of position movement, rotation, and size scaling of the original structural image 400c.

In a related embodiment, the method of material searching 600 can further include:

training a semantic model 618 using a machine learning method to compare an input structural image 400c with a target tag 522, 524 to produce a semantic match indicator;

wherein the semantic model 219 is trained on a plurality of pairs of a structural image 400c and an associated tag 522, 524 in the stored material representations, to produce a positive semantic match indicator.

In related embodiments, the material search device 104 can include configurations as:

a) a mobile app, executing on a mobile device, such as for example an ANDROID™ or IPHONE™, or any wearable mobile device;

b) a tablet app, executing on a tablet device, such as for example an ANDROID™ or IOS™ tablet device;

c) a web application, executing in a Web browser;

d) a desktop application, executing on a personal computer, or similar device; or e) an embedded application, executing on a processing device, such as for example a smart TV, a game console or other system.

It shall be understood that an executing instance of an embodiment of the material search system 100, as shown in FIG. 1, can include a plurality of material search devices 104, which are each tied to one or more users 122.

An executing instance of an embodiment of the material search system 100, as shown in FIG. 1, can similarly include a plurality of material search servers 102.

In related embodiments of the material search system 100, functions provided by the material search device 104 in communication with the material search server 102 will be disclosed in the following with reference to particular application views of the graphical user interface of the material search device 104.

In a related embodiment, the material search device 104 can be configured to allow a user to set up smart tags 522, 524 according to a customizable tagging system. The customizable tagging system allows for creation of tags, which are context sensitive, such that the tagging system allows for defining dependencies of tags, within a tag taxonomy/hierarchy, such that tags can be parent tags, which can be associated with specific sub-tags that apply to such particular parent tag. A sub-tag can belong to multiple parent tags. A sub-tag can act as a parent tag to other sub-tags. The dependencies, referred to as "depth", can be unbounded, such that a user 122 can set up as many levels of sub-tags as desired. A tagging system or subset of a tagging system can be set up for a manufacturer/make, and its associated brands, and models. A master/parent tag for a particular brand, can for example have a footwear sub-tag, which has the further sub-tags {athletic men, athletic women, casual men, casual women, formal men, formal woman}, each of which has an associated set of model sub-tags, each of which are associated with at least one 3D model.

In a related embodiment, a smart tag can be associated with a a) numerical value;

b) numerical range;

c) text descriptor; and/or d) a 3D object shape representation.

In yet a related embodiment, the customizable tagging system can include a hierarchy of tags, comprising at least one parent tag, which is associated with a plurality of sub-tags.

FIGS. 1, 2, 3, and 6 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1, 2, and 3 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random-access memory (RAM) and read-only memory (ROM). The computer also may include nonvolatile storage memory, such as a hard disk drive, where additional data can be stored.

FIG. 1 shows a depiction of an embodiment of the material search system 100, including the material search server 102, and the material search device 104. In this relation, a server shall be understood to represent a general computing capability that can be physically manifested as one, two, or a plurality of individual physical computing devices, located at one or several physical locations. A server can for example be manifested as a shared computational use of one single desktop computer, a dedicated server, a cluster of rack-mounted physical servers, a datacenter, or network of datacenters, each such datacenter containing a plurality of physical servers, or a computing cloud, such as AMAZON EC2™ or MICROSOFT AZURE™.

It shall be understood that the above-mentioned components of the material search server 102 and the material search device 104 are to be interpreted in the most general manner.

For example, the processors 202 302 can each respectively include a single physical microprocessor or microcontroller, a cluster of processors, a datacenter or a cluster of datacenters, a computing cloud service, and the like.

In a further example, the non-transitory memory 204 and the non-transitory memory 304 can each respectively include various forms of non-transitory storage media, including random access memory and other forms of dynamic storage, and hard disks, hard disk clusters, cloud storage services, and other forms of long-term storage. Similarly, the input/output 206 and the input/output 306 can each respectively include a plurality of well-known input/output devices, such as screens, keyboards, pointing devices, motion trackers, communication ports, and so forth.

Furthermore, it shall be understood that the material search server 102 and the material search device 104 can each respectively include a number of other components that are well known in the art of general computer devices, and therefore shall not be further described herein. This can include system access to common functions and hardware, such as for example via operating system layers such as WINDOWS™, LINUX™, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN) and can include all of the necessary circuitry for such a connection.

In a related embodiment, the material search device 104 communicates with the material search server 102 over a network 106, which can include the general Internet, a Wide Area Network or a Local Area Network, or another form of communication network, transmitted on wired or wireless connections. Wireless networks can for example include Ethernet, Wi-Fi, BLUETOOTH™, ZIGBEE™, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the material search system 100, the material search device 104, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the material search server 102 and the material search device 104. The components of the material search server 102 can be distributed over a plurality of physical, logical, or virtual servers. Parts or all of the components of the material search device 104 can be configured to operate in the material search server 102, whereby the material search device 104 for example can function as a thin client, performing only graphical user interface presentation and input/output functions. Alternatively, parts or all of the components of the material search server 102 can be configured to operate in the material search device 104.

Many such alternative configurations are readily apparent and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A material search system, comprising:
    a) a material search server, comprising:
        a processor;
        a non-transitory memory;
        an input/output component;
        a material library, which comprises a plurality of stored material representations, each comprising:
            a visual image, which is a representation of a physical material sample; and
            a structural image, which is a two-dimensional matrix of heights of the physical material sample;
        wherein the material search server is configured to search in the stored material representations of the material library, wherein the material search server is configured to perform a reverse structure search in the material library using a reverse structure search algorithm, wherein the reverse structure search algorithm takes an input structural image and returns a plurality of matching output structural images, which are associated with the plurality of stored material representations of the material library; and
    b) a material search device, which is connected to the material search server;
    wherein the material search device is configured to enable a user to search for images in the material library, by using search criteria provided by the user;
    such that the material search server generates a plurality of output material representations that match the search criteria.

2. The material search system of claim 1, wherein each stored material representation in the plurality of stored material representations further comprises:
    a color palette, which comprises a plurality of primary material colors that are used in the visual image.

3. The material search system of claim 1, wherein each stored material representation in the plurality of stored material representations further comprises:
    a semantic structure, which comprises at least one tag, which describes a property of the physical material sample.

4. The material search system of claim 3, wherein the material search server is configured to perform a semantic search of the plurality of stored material representations, wherein the semantic search takes at least one input tag and returns a plurality of matching output material representations with a matching semantic structure that comprises the at least one input tag.

5. The material search system of claim 3, wherein the material search server further comprises:
    a semantic model;
    wherein the material search server is configured to train the semantic model using a machine learning method to compare an input structural image with a target tag to produce a semantic match indicator;
    wherein the semantic model is trained on a plurality of pairs of an original structural image and an associated tag from the stored material representations, to produce a positive semantic match indicator.

6. The material search system of claim 1, wherein the material search server is configured to perform a reverse image search in the material library using a reverse image search algorithm, wherein the reverse image search algorithm takes an input visual image and returns a plurality of matching output visual images, which are associated with the stored material representations of the material library.

7. The material search system of claim 1, wherein the material search server further comprises:
    an image translation model;
    wherein the material search server is configured to train the image translation model using a machine learning method to compare an input visual image with a target visual image to produce a visual match indicator;
    wherein the image translation model is trained on a plurality of pairs of a generated translated visual image and an original visual image, to produce a positive visual match indicator;
    wherein the generated translated visual image is generated by an automatic translation from the original visual image, wherein the automatic translation comprises at least one or a combination of position movement, rotation, and size scaling of the original visual image.

8. The material search system of claim 7, wherein the image translation model is a convolutional artificial neural network with at least two hidden layers.

9. The material search system of claim 1, wherein the material search server further comprises:
    a structural translation model;
    wherein the material search server is configured to train the structural translation model using a machine learning method to compare an input structural image with a target structural image to produce a structural match indicator;
    wherein the structural translation model is trained on a plurality of pairs of a generated translated structural image and an original structural image, to produce a positive structural match indicator;
    wherein the generated translated structural image is generated by an automatic translation from an original structural image, wherein the automatic translation comprises at least one or a combination of position movement, rotation, and size scaling of the original structural image.

10. A method of material searching, comprising:
    a) searching a material library according to predetermined search criteria, wherein the material library comprises a plurality of stored material representations, each comprising:
        a visual image, which is a representation of a physical material sample;
        a structural image, which is a two-dimensional matrix of heights of the physical material sample; and a semantic structure, which comprises at least one tag, which describes a property of the physical material sample;

b) generating a plurality of output material representations that match the predetermined search criteria; and c) training a semantic model using a machine learning method to compare an input structural image with a target tag to produce a semantic match indicator, wherein the semantic model is trained on a plurality of pairs of an original structural image and an associated tag in the stored material representations, to produce a positive semantic match indicator.

11. The method of material searching of claim 10, wherein each stored material representation in the plurality of stored material representations further comprises:

a color palette, which comprises a plurality of primary material colors that are used in the visual image.

12. The method of material searching of claim 10, wherein each stored material representation in the plurality of stored material representations further comprises:

a semantic structure, which comprises at least one tag, which describes a property of the physical material sample.

13. The method of material searching of claim 12, further comprising:

performing a semantic search of the plurality of stored material representations, wherein the semantic search takes at least one input tag and returns a plurality of matching output material representations with a matching semantic structure that comprises the at least one input tag.

14. The method of material searching of claim 10, further comprising:

performing a reverse image search in the material library using a reverse image search algorithm, wherein the reverse image search algorithm takes an input visual image and returns a plurality of matching output visual images, which are associated with the stored material representations of the material library.

15. The method of material searching of claim 10, further comprising:

performing a reverse structure search in the material library using a reverse structure search algorithm, wherein the reverse structure search algorithm takes an input structural image and returns a plurality of matching output structural images, which are associated with the plurality of stored material representations of the material library.

16. The method of material searching of claim 10, further comprising:

training an image translation model using a machine learning method to compare an input visual image with a target visual image to produce a visual match indicator;

wherein the image translation model is trained on a plurality of pairs of a generated translated visual image and an original visual image, to produce a positive visual match indicator;

wherein the generated translated visual image is generated by an automatic translation from the original visual image, wherein the automatic translation comprises at least one or a combination of position movement, rotation, and size scaling of the original visual image.

17. The method of material searching of claim 16, wherein the image translation model is a convolutional artificial neural network with at least two hidden layers.

18. The method of material searching of claim 10, further comprising:

training a structural translation model using a machine learning method to compare an input structural image with a target structural image to produce a structural match indicator;

wherein the structural translation model is trained on a plurality of pairs of a generated translated structural image and an original structural image, to produce a positive structural match indicator;

wherein the generated translated structural image is generated by an automatic translation from the original structural image, wherein the automatic translation comprises at least one or a combination of position movement, rotation, and size scaling of the original structural image.

19. A material search system, comprising:

a) a material search server, comprising:

a processor;

a non-transitory memory;

an input/output component; and a material library, which comprises a plurality of stored material representations, each comprising:

a visual image, which is a representation of a physical material sample; and a structural image, which is a two-dimensional matrix of heights of the physical material sample;

wherein the material search server is configured to search in the stored material representations of the material library, wherein the material search server further comprises:

a structural translation model;

wherein the material search server is configured to train the structural translation model using a machine learning method to compare an input structural image with a target structural image to produce a structural match indicator;

wherein the structural translation model is trained on a plurality of pairs of a generated translated structural image and an original structural image, to produce a positive structural match indicator; and wherein the generated translated structural image is generated by an automatic translation from an original structural image, wherein the automatic translation comprises at least one or a combination of position movement, rotation, and size scaling of the original structural image; and b) a material search device, which is connected to the material search server;

wherein the material search device is configured to enable a user to search for images in the material library, by using search criteria provided by the user;

such that the material search server generates a plurality of output material representations that match the search criteria.

20. A material search system, comprising:

a) a material search server, comprising:

a processor;

a non-transitory memory;

an input/output component;

a material library, which comprises a plurality of stored material representations, each comprising:

a visual image, which is a representation of a physical material sample; and a structural image, which is a two-dimensional matrix of heights of the physical material sample; and wherein the material search server is configured to search in the stored material representations of the material library, wherein the material search server further comprises:
a semantic model;
wherein the material search server is configured to train a semantic model using a machine learning method to compare an input structural image with a target tag to produce a semantic match indicator; and
wherein the semantic model is trained on a plurality of pairs of an original structural image and an associated tag from the stored material representations, to produce a positive semantic match indicator; and
b) a material search device, which is connected to the material search server;
wherein the material search device is configured to enable a user to search for images in the material library, by using search criteria provided by the user;
such that the material search server generates a plurality of output material representations that match the search criteria.

\* \* \* \* \*